US008666393B2

(12) United States Patent
Faronius et al.

(10) Patent No.: US 8,666,393 B2
(45) Date of Patent: Mar. 4, 2014

(54) NOTIFYING USER EQUIPMENT OF AN UPCOMING CHANGE OF SYSTEM INFORMATION IN A RADIO COMMUNICATION NETWORK

(75) Inventors: Carola Faronius, Järfälla (SE); Leo Hedlund, Älvsjö (SE); Walter Müller, Upplands Väsby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/266,436

(22) PCT Filed: Apr. 27, 2009

(86) PCT No.: PCT/SE2009/050438
§ 371 (c)(1),
(2), (4) Date: Oct. 26, 2011

(87) PCT Pub. No.: WO2010/126409
PCT Pub. Date: Nov. 4, 2010

(65) Prior Publication Data
US 2012/0052860 A1    Mar. 1, 2012

(51) Int. Cl.
*H04W 4/00*    (2009.01)
(52) U.S. Cl.
USPC ........ 455/426.1; 455/458; 455/522; 455/574; 370/328; 370/329; 370/311
(58) Field of Classification Search
USPC ............... 455/426.1, 458, 522, 574; 370/329, 370/328, 311
See application file for complete search history.

(56) References Cited

U.S. PATENT DOCUMENTS

2004/0142706 A1*  7/2004  Kim et al. ............... 455/458
2011/0075621 A1*  3/2011  Sung et al. .............. 370/329
2011/0294491 A1* 12/2011  Fong et al. ............ 455/422.1

OTHER PUBLICATIONS

3rd Generation Partnership Project. "Update of System Information." 3GPP TSG RAN WG2 LET RRC adhoc, R2-075535, Vienna, Austria, Dec. 13-14, 2007.
European Telecommunications Standards Institute. ETSI TS 136 300, V8.8.0 (Apr. 2009). LTE; Evolved Universal Terrestrial Radio Access (E-UTRA) and Evolved Universal Terrestrial Radio Access Network (E-UTRAN); Overall description; Stage 2 (3GPP TS 36.300 version 8.8.0 Release 8). Apr. 2009.

(Continued)

*Primary Examiner* — Kwasi Karikari
(74) *Attorney, Agent, or Firm* — Coats and Bennett PLLC

(57) ABSTRACT

A basic idea is to introduce an additional paging schedule for user equipment in connected mode that differs from the paging schedule used for user equipment in idle mode. Consequently, the inventive mechanism relies on distributing (S1) a notification of an upcoming change of system information in paging messages according to a first paging schedule for user equipment in idle mode, and distributing (S2) a notification of an upcoming change of system information in paging messages according to a second paging schedule for user equipment in connected mode. The second paging schedule for user equipment in connected mode is different from the first paging schedule for user equipment in idle mode. In this way, a satisfactory load distribution is achieved, at the same time as UEs in both connected and idle mode are able to receive important system information notifications.

18 Claims, 11 Drawing Sheets

(56) References Cited

OTHER PUBLICATIONS

3rd Generation Partnership Project, "Technical Specification Group Radio Access Network; Evolved Universal Terrestrial Radio Access (E-UTRA); Physical Channels and Modulation (Release 8)", 3GPP TS 36.211 V8.4.0 Sep. 2008, pp. 1-78, 650 Route des Lucioles—Sophia Antipolis, Valbonne, France.

3rd Generation Partnership Project, "Technical Specification Group Radio Access Network, Evolved Universal Terrestrial Radio Access (E-UTRA), Multiplexing and Channel Coding (Release 8)", 3GPP TS 36.212 V8.4.0 (Sep. 2008), pp. 1-56, 650 Route des Lucioles—Sophia Antipolis, Valbonne, France.

3rd Generation Partnership Project, "Technical Specification Group Radio Access Network, Evolved Universal Terrestrial Radio Access (E-UTRA), Medium Access Control (MAC) Protocol Specification (Release 8)", 3GPP TS 36.212 V8.3.0 (Sep. 2008), pp. 1-36, 650 Route des Lucioles—Sophia Antipolis, Valbonne, France.

3rd Generation Partnership Project, "Technical Specification Group Radio Access Network, Evolved Universal Terrestrial Radio Access (E-UTRA), Radio Resource Control (RRC), Protocol Specification (Release 8)", 3GPP TS 36.331 V8.3.0 (Sep. 2008), pp. 1-56, 650 Route des Lucioles—Sophia Antipolis, Valbonne, France.

\* cited by examiner

NOTIFYING USER EQUIPMENT OF AN UPCOMING CHANGE OF SYSTEM INFORMATION IN A RADIO COMMUNICATION NETWORK

TECHNICAL FIELD

The invention generally relates to radio communication networks, and more particularly to procedures in connection with changes in system information in such networks.

BACKGROUND

Once a user terminal has synchronized to a radio cell in a radio communication network, acquired the physical-layer identity of the cell and detected the cell frame timing, the terminal also has to acquire the cell system information. This system information is normally broadcasted repeatedly by the network, and needs to be acquired by user terminals in order for them to be able to access and operate properly within the network and within a specific cell.

Examples of relevant system information include information about downlink and uplink cell bandwidths and/or configurations, parameters related to random access transmission, uplink power control and so forth.

For a better understanding, it may be useful with a brief introduction and overview of an exemplary radio communication system based on LTE (Long Term Evolution).

LTE is a novel radio access technology being standardized by 3GPP. Only the Packet Switched (PS) domain will be supported by LTE, i.e. all services are to be supported in the PS domain. The standard will be based on OFDM (Orthogonal Frequency Division Multiplexing) in the downlink and SC-FDMA (Single Carrier Frequency Domain Multiple Access) in the uplink.

The LTE radio access architecture is based around the LTE radio base stations, referred to as eNodeB:s, which communicate with mobile terminals, also referred to as User Equipment (UE). One of the basic principles of LTE radio access is shared-channel transmission in which time-frequency resources are dynamically shared between users.

With reference to FIG. 1, in the time domain, one sub frame of 1 ms duration is divided into 12 or 14 OFDM (or SC-FDMA) symbols, depending on the configuration. One OFDM (or SC-FDMA) symbol includes a number of sub carriers in the frequency domain, depending on the channel bandwidth and configuration. One OFDM (or SC-FDMA) symbol on one sub carrier is referred to as an RE (Resource Element). FIG. 1 is valid for an example with 2 antennas. If by way of example 4 antennas are used, twice as many reference symbols will be transmitted.

In LTE no dedicated data channels are used, instead shared channel resources are used in both downlink and uplink. These shared resources, DL-SCH (Downlink Shared Channel) and UL-SCH (Uplink Shared Channel), are controlled by scheduling functionality that assigns different parts of the downlink and uplink shared channels to different UEs for reception and transmission respectively.

The assignments for the DL-SCH and the UL-SCH are transmitted in a control region covering a few OFDM symbols in the beginning of each downlink sub frame, as indicated in FIG. 1. The DL-SCH is transmitted in a data region covering the rest of the OFDM symbols in each downlink sub frame. The UEs will be required to monitor the control region to be able to detect the assignments directed to them in the data region. The assignments in the control region are typically carried by Physical Downlink Control Channels (PDCCHs). The downlink shared channel available for data transfer in the data region is made up of the Physical Downlink Shared Channel (PDSCH).

In Long Term Evolution (LTE) systems, for example, system information is generally delivered by two different mechanisms relying on two different transport channels:

A limited amount of system information, corresponding to the so-called Master Information Block (MIB), is transmitted using the so-called Broadcast Channel (BCH).

A larger part of system information, corresponding to different so-called System Information Blocks (SIBS), is transmitted using the downlink shared channel (DL-SCH).

The MIB transmitted using BCH generally includes such system information that is absolutely necessary for a user terminal to be able to read the remaining SIB system information provided using DL-SCH.

FIG. 2 is a schematic diagram illustrating the mapping between logical channels, transport channels and physical channels for the downlink in the particular example of LTE.

The Medium Access Control (MAC) layer offers services to the Radio Link Control (RLC) layer in the form of logical channels. A logical channel is generally defined by the type of information it carries and is normally classified as a control channel, used for transmission of control and configuration information necessary for operating an LTE system, or a data channel used for user data. The set of logical channels defined for LTE includes:

Paging Control Channel (PCCH) used for paging mobile user terminals, also referred to as User Equipment (UE).

Broadcast Control Channel (BCCH) used for transmission of system information from the network to all mobile user terminals in a cell.

Common Control Channel (CCCH) used for transmission of control information in conjunction with random access.

Dedicated Traffic Channel (DTCH) used for transmission of user data to/from a mobile terminal.

Dedicated Control Channel (DCCH) used for transmission of control information for individual configuration of mobile terminals.

Multicast Traffic Channel (MTCH) used for downlink transmission of Multimedia Broadcast and Multicast Services (MBMS).

Multicast Control Channel (MCCH) used for transmission of control information required for reception of MTCH.

A similar logical channel structure is used for Wideband Code Division Multiple Access (WCDMA) and/or High Speed Packet Access (HSPA) systems. Compared to WCDMA/HSPA, LTE has a somewhat more simplified logical channel structure with a reduced number of logical channel types.

The physical layer offers services to the MAC layer in the form of so-called transport channels. A transport channel is generally defined by how and with what characteristics the information is transmitted over the radio interface. For example, for LTE, the following transport channels are defined for the downlink:

Paging Channel (PCH) is used for transmission of paging information from the PCCH logical channel.

Broadcast Channel (BCH) is used for transmission of parts of the BCCH system information, including the MIB block.

Downlink Shared Channel (DL-SCH) is the main transport channel, as previously mentioned.

Multicast Channel (MCH) is used to support MBMS services.

Each transport channel is mapped to a corresponding physical channel:
  Physical Broadcast Channel (PBCH) carries part of the system information required by the terminals to access the network.
  Physical Downlink Shared Channel (PDSCH) is the main physical channel for unicast transmission, and also for paging information.
  Physical Multicast Channel (PMCH) is used for Multicast/Broadcast over Single Frequency Network (MBSFN) operation.

It should though be noted that there are also physical channels without a corresponding transport channel, especially for Downlink Control Information (DCI):
  Physical Downlink Control Channel (PDCCH) is used for various downlink control information.
  Physical Hybrid-ARQ Indicator Channel (PHICH) carries the hybrid-ARQ acknowledgment to indicate whether or not a transport block should be retransmitted.
  Physical Control Format Indicator Channel (PCFICH) provides information necessary to decode the PDCCH.

There is a corresponding mapping (not shown) of logical channels, transport channels and physical channels for the uplink as well.

In LTE, for example, user equipment (UE) can be in two different states on Radio Resource Control (RRC) level, as illustrated in FIG. 3.

RRC_CONNECTED is the state used when the UE is active and connected to a specific cell within the network. RRC_CONNECTED can be said to have two sub-states, IN_SYNC and OUT_OF_SYNC, depending on whether or not the uplink is synchronized to the network.

RRC_IDLE is a so-called low activity state in which the UE sleeps most of the time in order to reduce battery consumption. Uplink synchronization is not maintained, and the only uplink transmission activity that may take place is so-called random access to move from RRC_IDLE to RRC_CONNECTED. In the downlink, the UE can wake up periodically to monitor the Paging Channel (PCH) according to a Discontinuous Reception (DRX) cycle in order to be paged for incoming calls, as will be explained in more detail below.

In addition to assignments for DL-SCH and UL-SCH, also assignments for the Paging Channel (PCH) are carried by PDCCHs in the control region. The PCH is used to transmit paging information to UEs in RRC_IDLE and/or to inform UEs in RRC_IDLE and UEs in RRC_CONNECTED about a system information change. A UE may verify that acquired system information remains valid by either regularly checking a certain value or, by looking for the mentioned system information change indication in the paging messages.

As mentioned above, LTE allows Discontinuous Reception (DRX) for the UEs in order to save UE battery. FIG. 4 is a schematic diagram illustrating the basic principles of the DRX mechanism. The DRX mechanism is used for allowing the UE terminal to sleep most of the time, with the UE receiver circuitry switched off, and only periodically wake up for a brief period of time to monitor the paging channel. As illustrated in FIG. 4, a DRX cycle period normally includes a short so-called On Duration period followed by a relatively longer Sleep period. For UEs in RRC_IDLE a DRX pattern aligned to the basic paging schedule is applied on a group basis for a set of UEs. The DRX pattern is aligned to the paging schedule in such a way that the UE has a possibility to read the paging messages while awake rather than while in the battery saving DRX sleep mode.

In order to further reduce the battery consumption of the UEs, DRX functionality for UEs in RRC_CONNECTED may also be applied. Several parameters, resulting in a huge amount of different possible configurations, have been standardized for this purpose.

Applying a DRX pattern for RRC_CONNECTED UEs aligned to the DRX pattern for RRC_IDLE UEs makes it possible for a UE to detect the paging messages, including system information notifications, in both RRC_CONNECTED and RRC_IDLE. Unfortunately, it turns out that this approach leads to problems with respect to network performance and operation.

Similar problems related to distribution of system information notifications and/or indications can also be found in other radio communication networks having user equipment operating based on Discontinuous Reception (DRX) in connected and idle modes.

SUMMARY

It is a general object to provide an efficient way of notifying user equipment of an upcoming change of system information in a radio communication network.

It is a specific object to provide a method for notifying user equipment operating based on Discontinuous Reception (DRX) of an upcoming change of system information in a radio communication network.

It is another specific object to provide an improved radio base station for a radio communication network.

The use of a DRX pattern for connected UEs aligned to the basic DRX pattern for idle UEs makes it possible for a UE to detect the paging messages, including system information notifications, in both connected and idle mode. However, the inventors have recognized that this approach suffers from several problems with respect to network performance and operation. For example, a severe problem is related to load peaks caused by synchronized DRX patterns for connected UEs. The load peaks are more of a problem for connected UEs due to their higher degree of activity compared to UEs in idle mode. The poor load distribution resulting from the load peaks in turn causes reduced throughput and delays in the radio communication network.

If unsynchronized DRX patterns for connected UEs are allowed in order to avoid load peaks and/or for other reasons, the problem of distributing notifications of upcoming changes of system information in an efficient manner remains.

A basic idea is to therefore introduce an additional paging schedule for user equipment in connected mode that differs from the paging schedule used for user equipment in idle mode. Consequently, the inventive mechanism relies on distributing a notification of an upcoming change of system information in paging messages according to a first paging schedule for user equipment in idle mode, and distributing a notification of an upcoming change of system information in paging messages according to a second paging schedule for user equipment in connected mode. The second paging schedule for user equipment in connected mode is different from the first paging schedule for user equipment in idle mode.

In this way, a satisfactory load distribution is achieved, at the same time as UEs in both connected and idle mode are able to receive important system information notifications.

There is also provided a radio base station for a radio communication network having user equipment operating based on Discontinuous Reception (DRX). The radio base station comprises a first distributer configured to distribute a notification of an upcoming change of system information in paging messages according to a first paging schedule for user equipment in idle mode, and a second distributer configured to distribute a notification of an upcoming change of system information in paging messages according to a second paging schedule for user equipment in connected mode. The second paging schedule for user equipment in connected mode is different from the first paging schedule for user equipment in idle mode.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

When unsynchronized DRX patterns for connected UEs are allowed in order to avoid load peaks and/or for other reasons, a basic idea is to introduce an additional paging schedule for user equipment in connected mode that differs from the paging schedule used for user equipment in idle mode.

Figure 1:
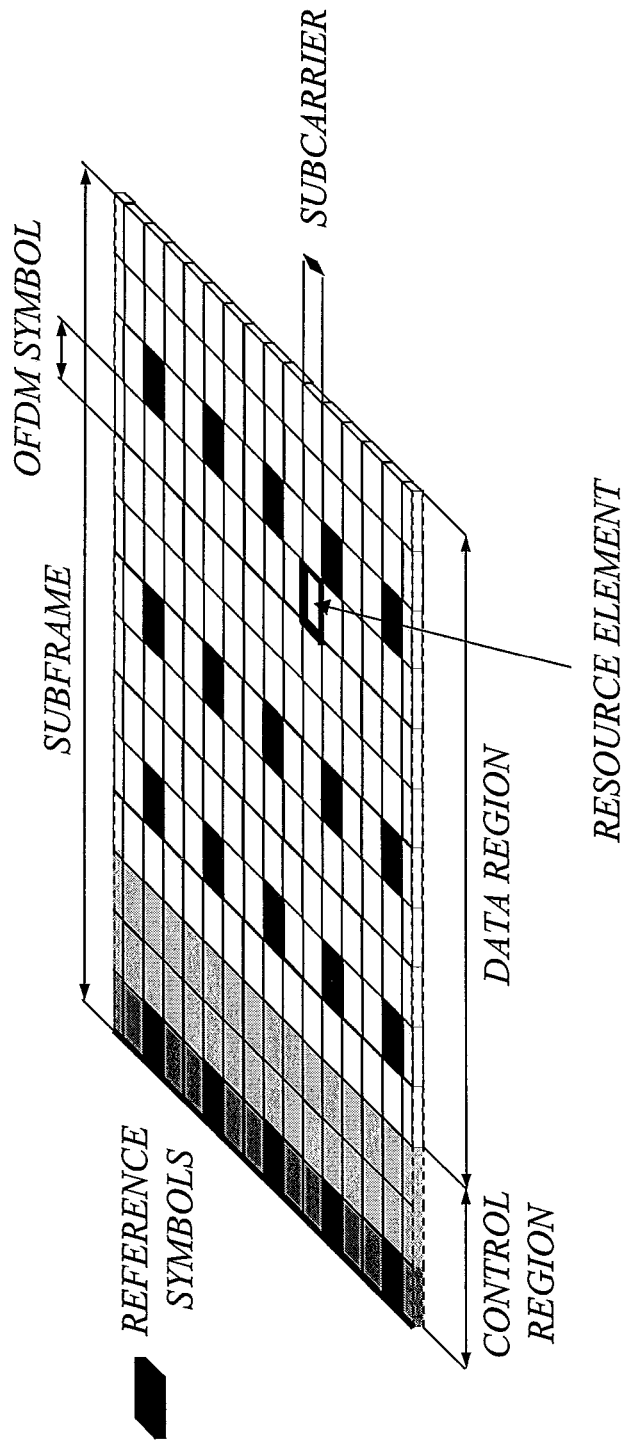
FIG. 1 is a schematic diagram illustrating an example of the structure of the time-frequency resources in a radio communication network operating based on shared-channel transmission.
Figure 2:
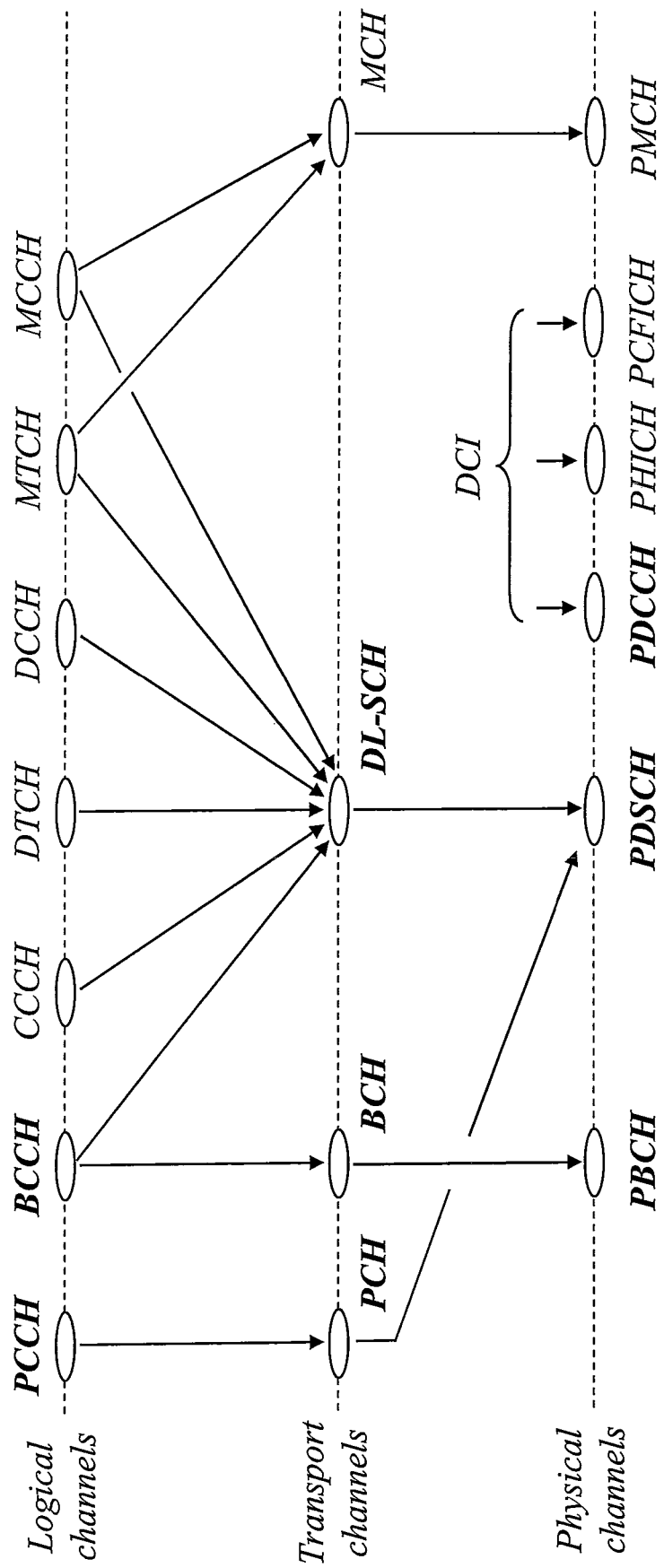
FIG. 2 is a schematic diagram illustrating the mapping between logical channels, transport channels and physical channels for the downlink in the particular example of LTE.
Figure 3:
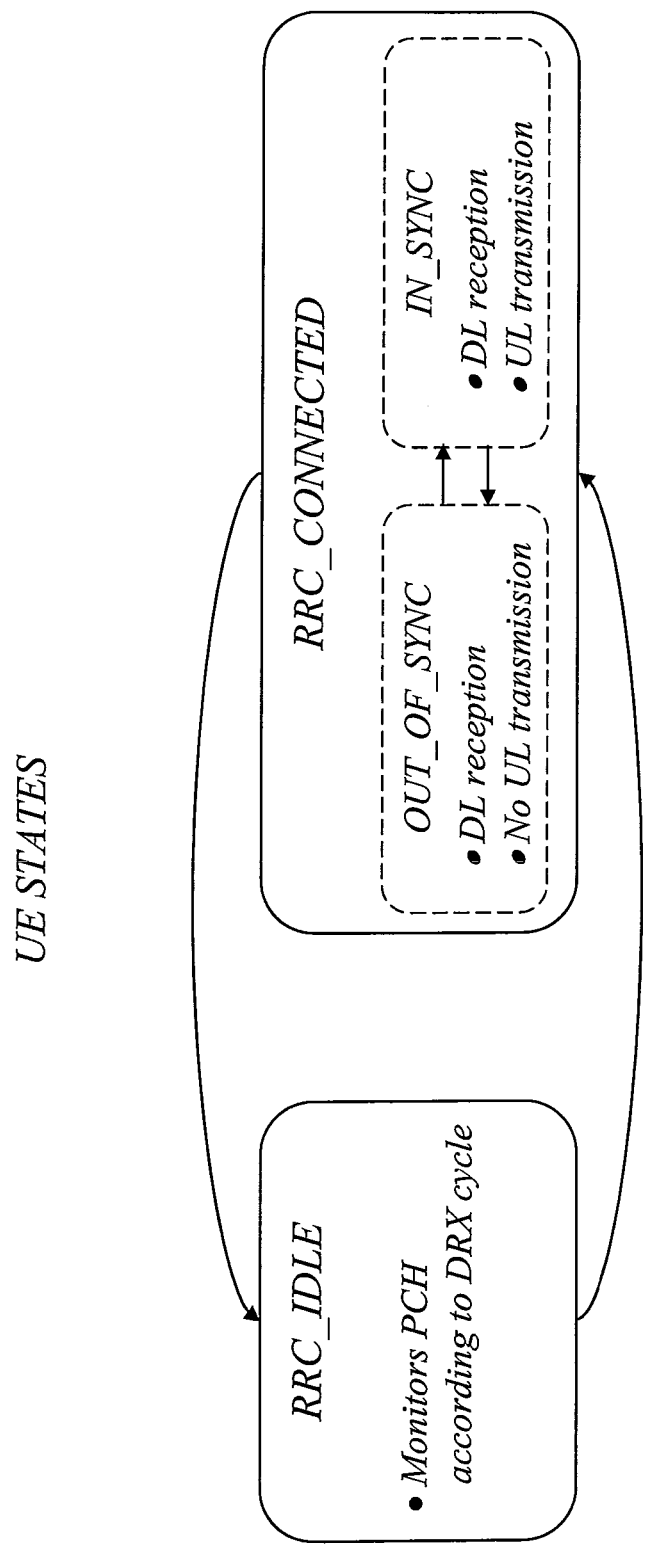
FIG. 3 is a schematic diagram illustrating two different UE states on Radio Resource Control (RRC) level.
Figure 4:
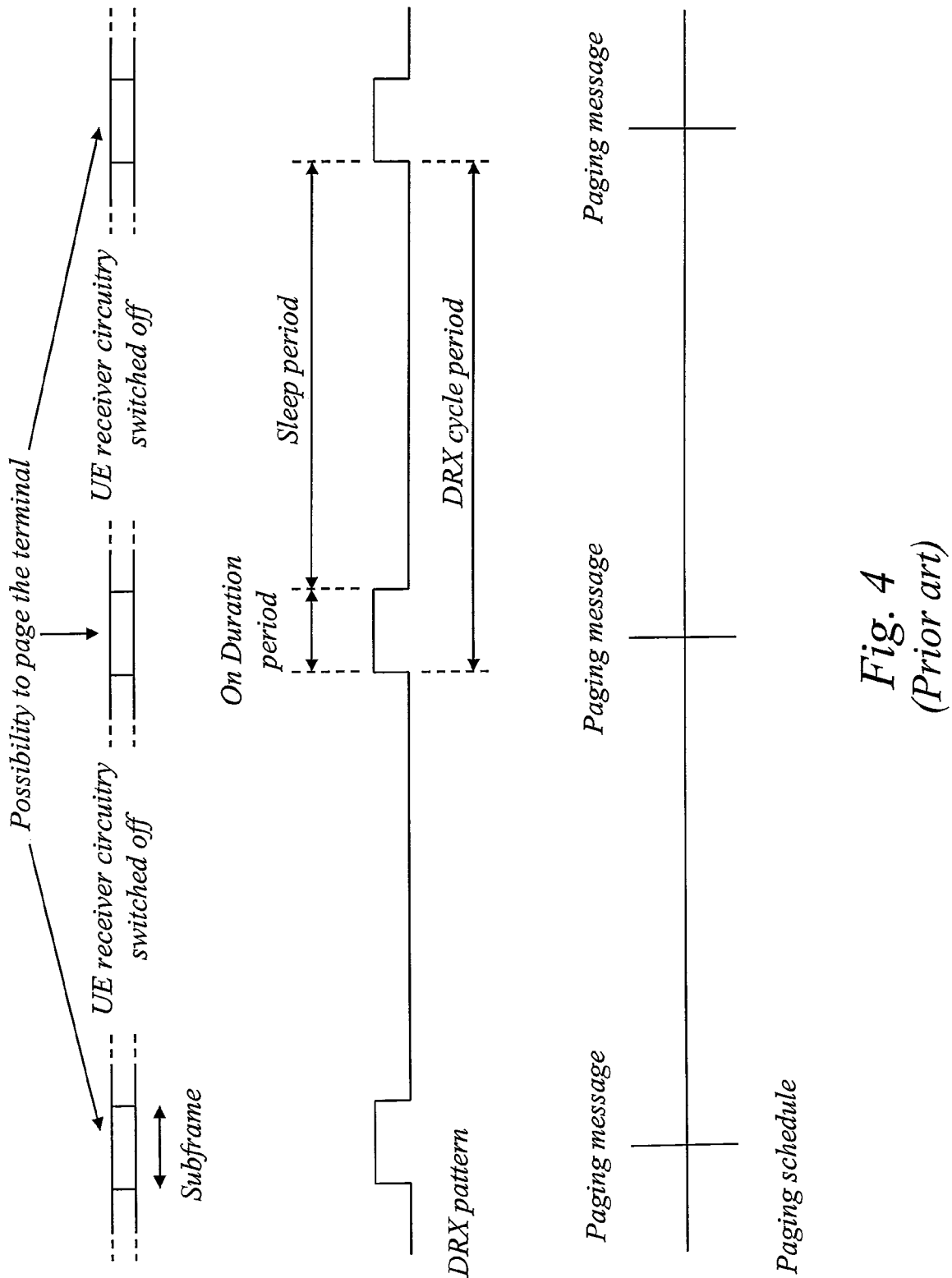
FIG. 4 is a schematic diagram illustrating the basic principles of the DRX mechanism.
Figure 5:
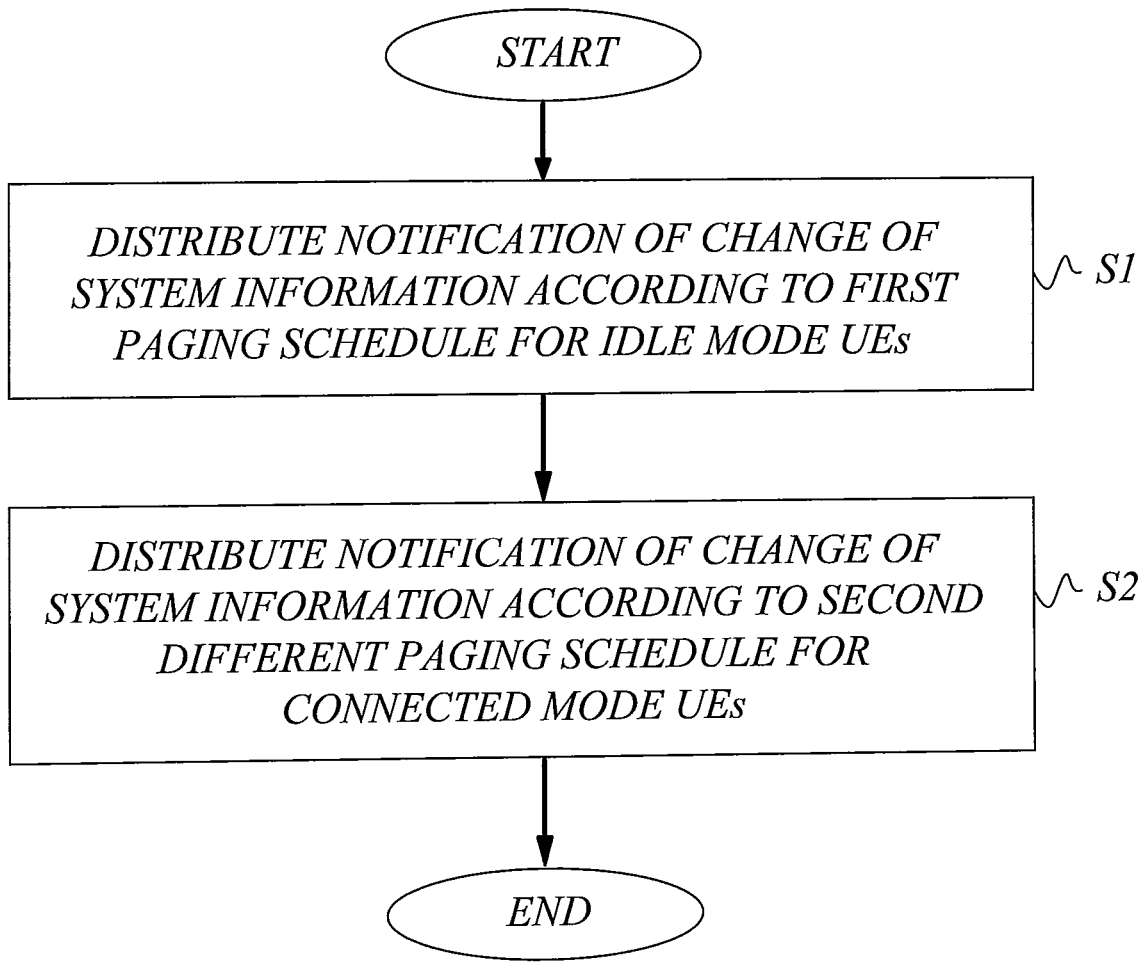
FIG. 5 is a schematic flow diagram illustrating an example of a method for notifying user equipment of an upcoming change of system information.

FIG. 5 is a schematic flow diagram illustrating an example of a method for notifying user equipment of an upcoming change of system information. Step S1 is based on distributing a notification of an upcoming change of system information in paging messages according to a first paging schedule for user equipment in idle mode. Step S2 is based on distributing a notification of an upcoming change of system information in paging messages according to a second different paging schedule for user equipment in connected mode.

In this way, a satisfactory load distribution is achieved, at the same time as UEs in both connected and idle mode are able to receive important system information notifications.

In an exemplary embodiment, the paging messages distributed according to the second paging schedule are common for user equipment in connected mode associated with a given cell in the radio communication network. There may thus be a separate paging schedule for connected UEs per cell. Preferably, the paging messages according to the second paging schedule are dedicated for user equipment in connected mode, and may also be dedicated for distributing system information change notifications. In other words, this separate paging schedule can be targeted jointly towards UEs in connected mode. Also, the paging messages according to this additional paging schedule may be configured for carrying indications of changed system information only, i.e., the purpose of these paging messages is not to page UEs in ordinary manner. Preferably, this additional paging schedule is intended solely and jointly for connected UEs and only applied during a modification period just prior to an occurring system information update.

Figure 6:
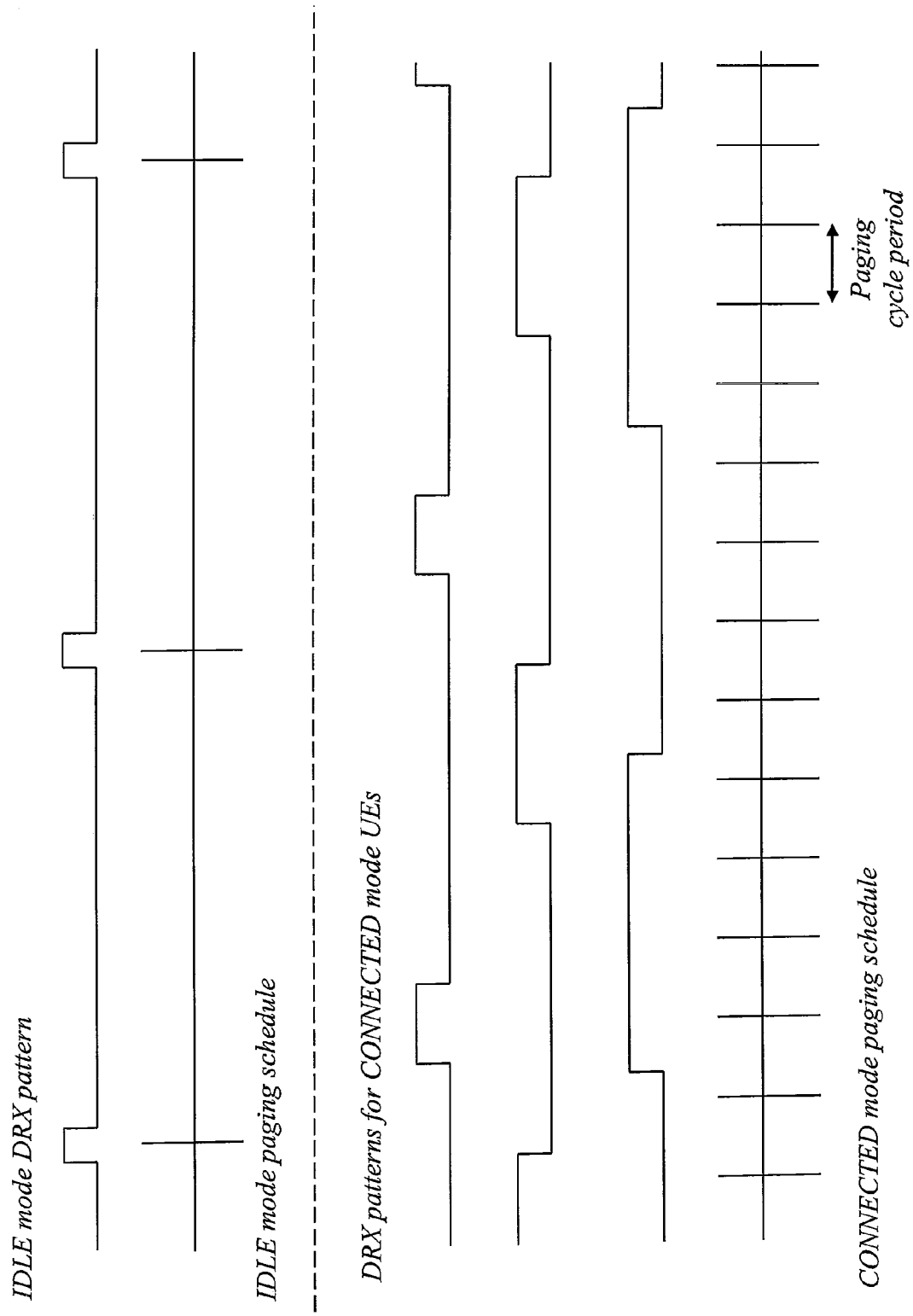
FIG. 6 is a schematic diagram illustrating an example of the use of two different paging schedules, an IDLE mode paging schedule and a CONNECTED mode paging schedule.

FIG. 6 is a schematic diagram illustrating an example of the use of two different paging schedules, an IDLE mode paging schedule and a CONNECTED mode paging schedule.

As can be seen from FIG. 6, the basic DRX pattern for a group of IDLE mode UEs is aligned with the basic paging schedule for IDLE mode UEs, the so-called IDLE mode paging schedule.

For connected UEs, unsynchronized DRX patterns are allowed. This basically means that any arbitrary DRX pattern is potentially allowed for an individual UE. Normally, various network settings and requirements may influence the actual DRX configuration for an individual UE. The actual DRX configuration is though beyond the scope of this invention. It suffice to say that the DRX patterns for connected mode UEs may vary significantly between different UEs, and it can also be noted that the DRX patterns for connected UEs are normally not aligned with the IDLE mode DRX pattern.

In order to be able to distribute a notification of an upcoming change of system information to connected UEs, an additional paging schedule is used for connected mode UEs, a so-called CONNECTED mode paging schedule. As can be seen from the example schematically illustrated in FIG. 6, the CONNECTED mode paging schedule differs from the IDLE mode paging schedule. Preferably, the paging schedule for user equipment in connected mode is independent of the paging schedule for user equipment in idle mode.

In an exemplary embodiment, IDLE mode corresponds to Radio Resource Control (RRC) IDLE mode, and CONNECTED mode corresponds to RRC CONNECTED mode.

In an exemplary embodiment, the CONNECTED mode paging schedule includes a paging cycle having a cycle period that is sufficiently short to be applicable to each of a plurality of connected UEs associated with a given cell in the radio communication network. This means that paging messages including a notification or equivalent indication of an upcoming change of system information is periodically distributed according to the separate CONNECTED mode paging schedule. With reference to the example of FIG. 6, the CONNECTED mode paging schedule is common for all connected UEs in the considered cell, irrespective of the various DRX cycle periods and DRX start offsets of the connected UEs. It should though be understood that as an alternative to the use of a periodical paging cycle, it is indeed possible to employ non-periodical transmission of paging messages.

It can be ensured that at least some of the paging messages will be received by the connected UEs if they are transmitted in each and every sub frame. However, this may be too costly from a transmission perspective. In an alternative embodiment, the paging schedule for connected UEs is preferably configured based on the DRX configuration of the connected UEs, e.g. based on the shortest DRX On Duration period of the considered connected UEs, as will be explained in more detail below.

Figure 7:
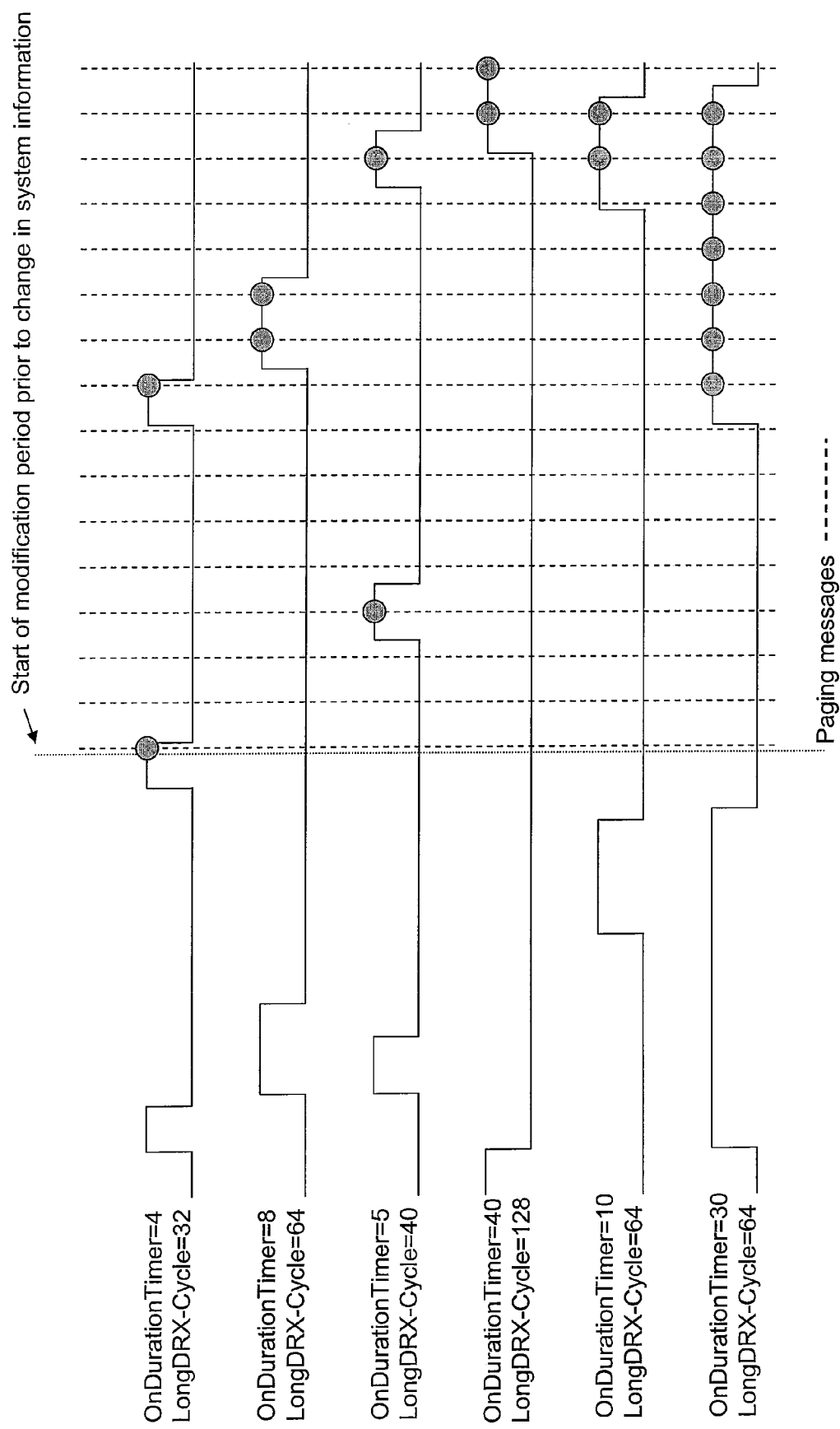
FIG. 7 is a schematic diagram illustrating an example of the configuration of a paging schedule for connected UEs.

FIG. 7 is a schematic diagram illustrating an example of the configuration of a paging schedule for connected UEs. Examples of DRX patterns for a number of connected UEs are illustrated in solid lines. These DRX patterns have different OnDurationTimers, here ranging from 4 to 40 sub frames, and different LongDRX Cycle periods, here ranging from 32 to 128 sub frames. In the example of FIG. 7, paging messages intended for the considered connected UEs are distributed at certain time instances indicated by dashed lines according to a separate paging schedule dedicated for connected UEs. In this example, the paging cycle of the CONNECTED mode paging schedule is adapted according to the shortest OnDurationTimer, corresponding to a paging cycle period of 4 sub frames. This means that all the connected UEs will have opportunities for receiving at least one of the paging messages including a notification of an upcoming change of system information, as indicated by the dots in FIG. 7.

As schematically illustrated in the example of FIG. 7, the paging messages of the CONNECTED mode paging schedule are distributed during at least part of a so-called modification period, preferably the whole period, prior to a change in system information. In order to reduce the signaling in the network, no paging messages are distributed according to the CONNECTED mode paging schedule when no system information needs to be updated. However, at the start of a modification period prior to an upcoming change in system information, it is beneficial to start distributing paging messages according to the CONNECTED mode paging schedule to ensure that all connected UEs will be given the opportunity to get informed of the upcoming change in system information so that they will be ready to listen for and receive the updated system information in the next modification period.

Figure 8:
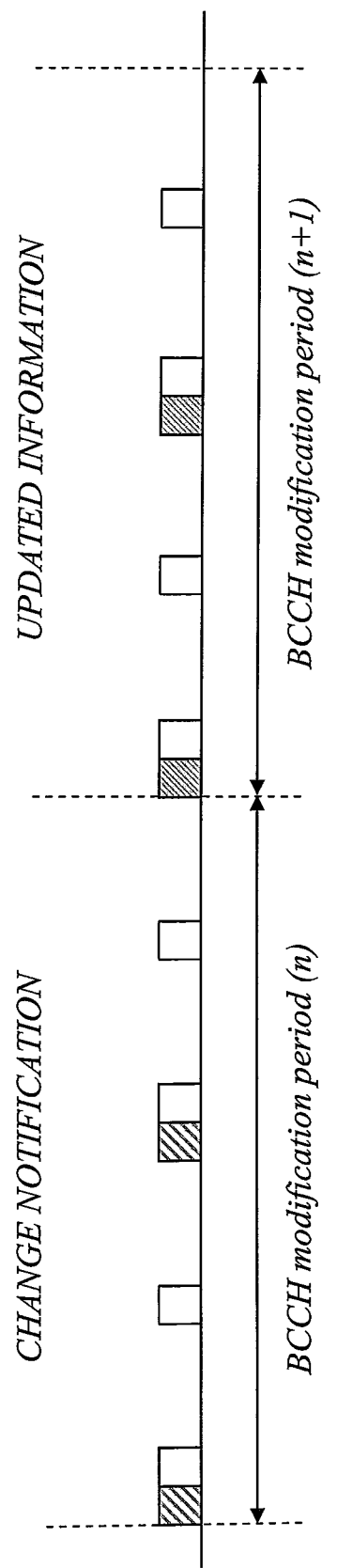
FIG. 8 illustrates an example of the basic framework for modification periods and their relation to system information distribution.

FIG. 8 illustrates an example of the basic standard framework for modification periods and their relation to system information distribution. The example of FIG. 8 relates to LTE and similar systems, but the invention is not limited to this particular context.

When the network changes (at least some of the) system information, it first notifies the UEs about this change before the actual change takes place. This notification may be performed during a modification period, such as BCCH (Broadcast Control Channel) modification period (n). In the next BCCH modification period (n+1), the network transmits the updated system information. Different types of hashing in the system information blocks of the two different BCCH modification periods of FIG. 8 indicate different system information. Upon receiving a change notification in modification period (n), a UE may then acquire the new system information at the start of the next modification period (n+1). The UE then applies the new updated system information, until the UE once again is notified of an upcoming change in system information and acquires new system information.

It should be understood that although the presented technology is especially applicable to LTE and RRC_CONNECTED UEs, the invention is not limited thereto. The technology may be applied to similar radio communication networks, under similar circumstances for distributing a notification of an upcoming change of system information to connected UEs operating based on DRX.

Figure 9:
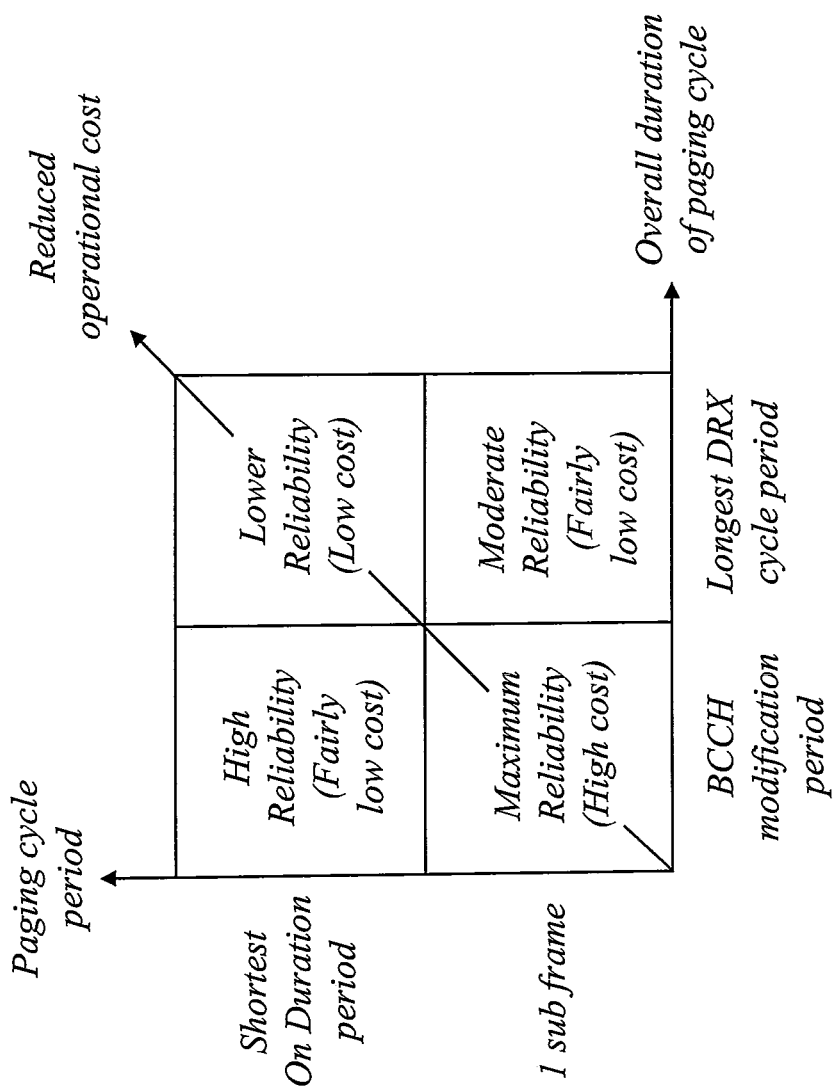
FIG. 9 is a schematic diagram illustrating the performance of four different paging schedules for connected UEs with respect to cost and reliability.

FIG. 9 is a schematic diagram illustrating the performance of four different paging schedules for connected UEs with respect to cost and reliability.

As previously mentioned, it can be ensured that all connected UEs will be able to receive system information notifications if paging messages are distributed in each and every sub frame during the entire BCCH modification period. This provides maximum reliability, but at a rather high cost.

The paging messages to be transmitted on PDSCH (Physical Downlink Shared Channel) in the data region of the downlink sub frame each requires a corresponding assignment in the form of a PDCCH (Physical Downlink Control Channel) in the control region of the downlink sub frame. Depending on the scenario, the PDCCH may however often be a scarce resource. To avoid overloading the PDCCH, it may be advisable to include an adaptation of the paging cycle of CONNECTED mode paging schedule. As previously mentioned, the CONNECTED mode paging cycle is preferably adapted based the shortest configured so-called On Duration period, also referred to as the "OnDurationTimer" in standard specifications. To obtain the lowest possible PDCCH load and at the same time ensure the possibility for each connected (RRC_CONNECTED) UE to receive at least one of the paging messages of the separate UE common connected mode paging schedule, potentially including a system information indication, a CONNECTED mode paging cycle corresponding to the shortest configured OnDurationTimer for the UEs in connected mode is applied. In other words, the connected mode paging schedule includes a paging cycle based on the shortest configured On Duration period for Discontinuous Reception (DRX) of a plurality of user equipment in connected mode associated with a given cell. More specifically, a paging message is transmitted at least every n:th sub frame during a Broadcast Control Channel (BCCH) modification period prior to a change in system information, where n corresponds to the shortest configured On Duration period for Discontinuous Reception (DRX). This provides a high degree of reliability at a fairly low cost.

Another variation includes transmission of a paging message in each of a number of sub frames during the longest Discontinuous Reception (DRX) cycle period of a plurality of user equipment in connected mode associated with a given cell. This provides a moderate degree of reliability at a fairly low cost.

It is also possible to use a paging cycle based on the shortest On Duration period, but only during the longest DRX cycle period, which is assumed to be shorter than the overall BCCH modification period. This gives an even lower cost, but also a lower degree of reliability.

To further reduce the PDCCH load at the same time as the possibility to receive the system information change notification is ensured without causing load peaks, the CONNECTED mode paging cycle should be completely deactivated during all modification periods which are not followed by an actual update of any system information. This is possible since the CONNECTED mode paging schedule and associated paging messages are setup solely to distribute system information notifications and hence not at all are needed to page UEs. Basically, this means that no paging messages are distributed according to the connected mode paging schedule during a period when no system information needs to be updated.

In the specific context of RRC_CONNECTED UEs, the possibility of improving the load distribution is enabled by decoupling the RRC_CONNECTED DRX pattern from the RRC_IDLE paging cycle, and carefully configuring a separate RRC_CONNECTED mode paging schedule for distributing a notification of a change in system information in the paging messages. In an exemplary embodiment, the load on PDCCH is limited by utilization of a common paging schedule for all RRC_CONNECTED UEs, a paging cycle period adapted to the configured OnDurationTimers, and by being able to deactivate the whole additional paging cycle for the RRC_CONNECTED UEs when no system information is about to be updated.

The above procedures may be implemented as functional units in a radio base station or similar unit, for example by hardware and/or a suitable combination of software and processing hardware for executing the software.

Figure 10:
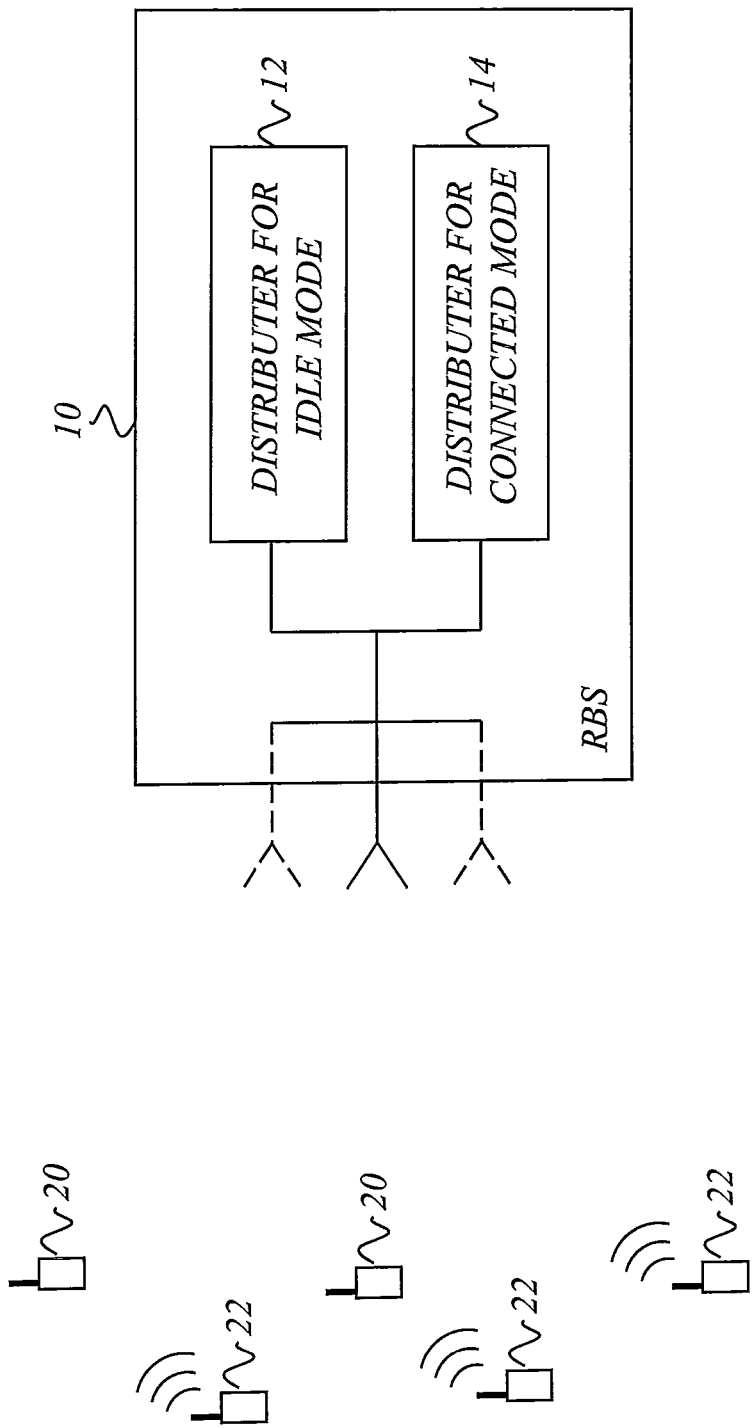
FIG. 10 is a schematic block diagram of a radio base station according to an exemplary embodiment.

FIG. 10 is a schematic block diagram of a radio base station according to an exemplary embodiment. The radio base station (RBS) 10 basically comprises a first distributer 12 configured to distribute paging messages according to a first paging schedule for user equipment 20 in IDLE mode, and a second distributer 14 configured to distribute paging messages according to a second paging schedule for user equipment in CONNECTED mode.

The second paging schedule for user equipment 22 in CONNECTED mode is different from the first paging schedule for user equipment in IDLE mode.

As previously mentioned, DRX is used for allowing UEs to sleep most of the time, with the UE receiver circuitry switched off, and only periodically wake up for a brief period of time to monitor the paging channel. For UEs in IDLE mode the DRX pattern is aligned to the first paging schedule. The first distributer 12 normally distributes standard paging information, including a notification of an upcoming change of system information when applicable, to IDLE mode UEs. The second distributer 14 is configured to distribute a notification of an upcoming change of system information in the paging messages according to the second paging schedule for user equipment in CONNECTED mode.

The radio base station naturally includes ordinary radio chains (not explicitly illustrated) and one or more antennas for supporting transmission of the paging messages.

Although the first distributer 12 and the second distributer 14 are illustrated as separate units in FIG. 10, it should be understood that they may be implemented in the same circuitry as different functional units.

Other examples and/or optional features of a radio base station will now be described below.

Figure 11:
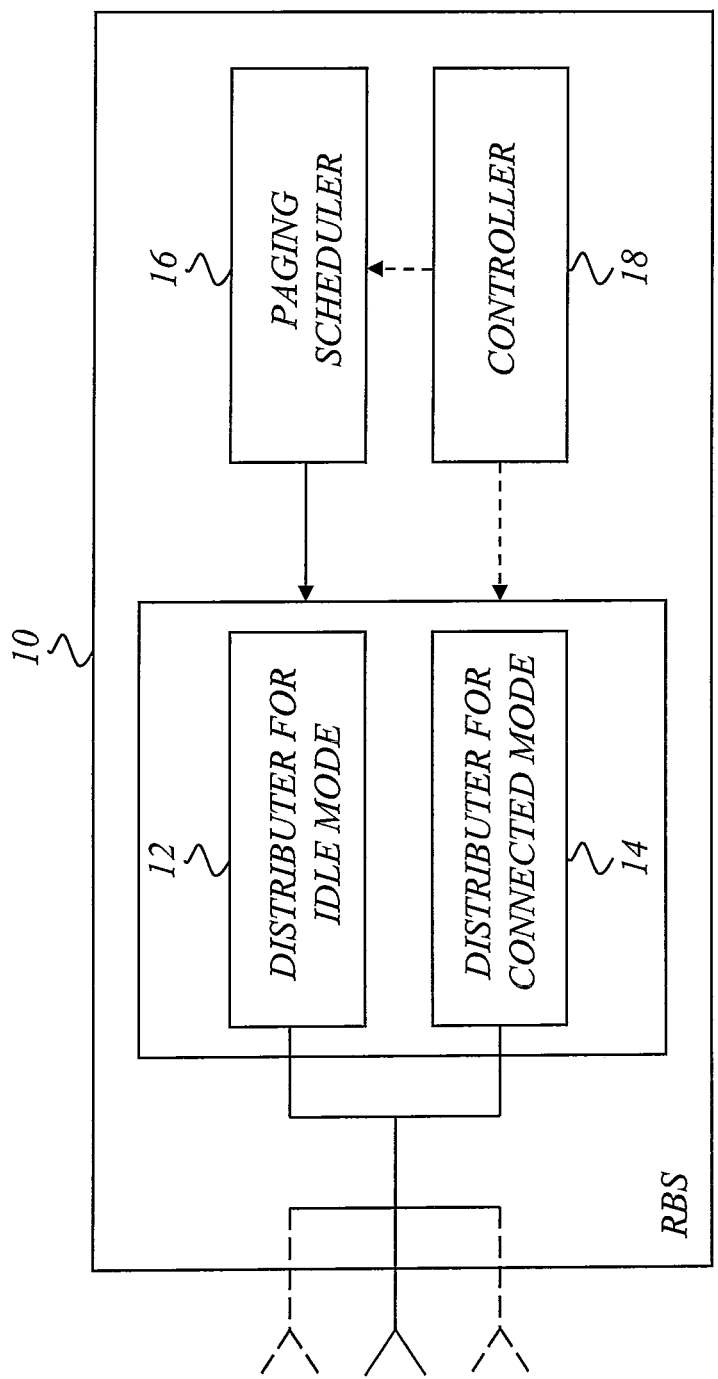
FIG. 11 is a schematic block diagram of a radio base station according to another exemplary embodiment.

FIG. 11 is a schematic block diagram of a radio base station according to another exemplary embodiment. The radio base station 10 of FIG. 11 includes a first distributer 12 for IDLE mode, and a second distributer 14 for CONNECTED mode, a paging scheduler 16 associated with the first and second distributers 12 and 14, and a controller 18 associated with the paging scheduler and/or the distributers 12 and 14.

The first distributer 12 is configured to distribute paging messages according to a first paging schedule for user equipment in IDLE mode. It distributes standard paging information, including a notification of an upcoming change of system information when applicable, to IDLE mode UEs. The second distributer 14 is configured to distribute a notification of an upcoming change of system information in paging messages according to a second paging schedule for user equipment in CONNECTED mode. The paging scheduler 16 and/or controller 18 may assist in configuring the paging schedules, unless default or manually configured paging schedules are implemented in the distributers 12 and 14.

In an exemplary embodiment, idle mode corresponds to Radio Resource Control (RRC) idle mode, and connected mode corresponds to RRC connected mode. Preferably, the second distributer 14 is configured to distribute paging messages according to the second paging schedule during at least part of a modification period prior to a change in system information.

The second distributer 14 is typically configured to distribute paging messages according to the second paging schedule that are common for connected user equipment associated with a given cell of the radio base station. In other words, there is normally a CONNECTED mode paging schedule per cell. As the expression indicates, the CONNECTED mode paging schedule is preferably dedicated for user equipment in connected mode. The paging messages according to the second paging schedule are normally also dedicated for distributing system information change notifications.

The paging scheduler 16 is preferably configured to make the second paging schedule for user equipment in connected mode independent of the first paging schedule for user equipment in idle mode. The paging scheduler 16 may be associated with a controller 18 that provides certain control input information that can be used for controlling the paging schedules. In particular, the controller 18 may be configured to define the second paging schedule such that no paging messages are distributed during a period when no system information needs to be updated. Relevant DRX information, such as DRX On Duration periods and DRX cycle periods, and information on BCCH modification periods and so forth will be available to the paging scheduler 16 and/or controller 18 as and when required.

It will be beneficial to configure the second distributer 14 for CONNECTED mode to distribute paging messages based on a paging cycle having a cycle period that is sufficiently short to be applicable to each of a number of connected user equipment associated with a given cell of the radio base station 10. For example, any of the CONNECTED mode paging schedules outlined in connection with FIG. 9 may be applied.

In the above presented block diagrams of FIGS. 10 and 11, only the units involved in the distribution of system information notifications are explicitly illustrated. It is therefore anticipated that a radio base station comprises other units and functionalities used in their traditional operations. For example, the radio base station may be based on an evolved NodeB (eNodeB) for a Long Term Evolution (LTE) system.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] 3GPP TS 36.211
[2] 3GPP TS 36.212
[3] 3GPP TS 36.321
[4] 3GPP TS 36.331

The invention claimed is:

1. A method for notifying user equipment operating based on Discontinuous Reception (DRX) of an upcoming change of system information in a radio communication network, the method comprising:
   distributing a notification of said upcoming change of system information in paging messages according to a first paging schedule for user equipment operating in a DRX state in an idle mode; and
   distributing a notification of said upcoming change of system information in paging messages according to a second paging schedule for user equipment operating in a DRX state in a connected mode, wherein said second paging schedule for user equipment operating in the DRX state in the connected mode is different from said first paging schedule for user equipment operating in the DRX state in the idle mode;

wherein said second paging schedule includes a paging cycle having a cycle period that is sufficiently short to be applicable to each of a plurality of user equipment that are operating in the DRX state in the connected mode, and are associated with a given cell in said radio communication network.

2. The method of claim 1, wherein said idle mode corresponds to a Radio Resource Control (RRC) idle mode, and said connected mode corresponds to a RRC connected mode, and wherein said distributing a notification of said upcoming change of system information in paging messages according to a second paging schedule is performed during at least part of a modification period prior to the change in system information.

3. The method of claim 1, wherein said second paging schedule includes a paging cycle based on the shortest configured On Duration period for DRX of said plurality of user equipment that are in the connected mode and that are associated with said given cell.

4. The method of claim 3, wherein said distributing a notification of said upcoming change of system information in paging messages according to a second paging schedule includes transmitting a paging message at least every $n^{th}$ sub frame during a Broadcast Control Channel (BCCH) modification period prior to the change in system information, where n corresponds to the shortest configured On Duration period for the DRX state of the connected mode.

5. The method of claim 1, wherein said distributing a notification of said upcoming change of system information in paging messages according to a second paging schedule includes transmitting a paging message in each of a number of sub frames during the longest DRX cycle period of said plurality of user equipment that are operating in the DRX state in the connected mode and that are associated with said given cell.

6. The method of claim 1, wherein said distributing a notification of said upcoming change of system information in paging messages according to a second paging schedule includes transmitting a paging message in each of a number of sub frames during a Broadcast Control Channel (BCCH) modification period prior to the change in system information.

7. A radio base station for a radio communication network having user equipment operating based on Discontinuous Reception (DRX), said radio base station comprising:
a first distributer configured to distribute a notification of an upcoming change of system information in paging messages according to a first paging schedule for user equipment operating in a DRX state in an idle mode; and
a second distributer configured to distribute a notification of an upcoming change of system information in paging messages according to a second paging schedule for user equipment operating in a DRX state in a connected mode, wherein said second paging schedule for user equipment operating in the DRX state in the connected mode is different from said first paging schedule for user equipment operating in the DRX state in the idle mode;
wherein said second distributer is configured to distribute paging messages according to said second paging schedule based on a paging cycle having a cycle period that is sufficiently short to be applicable to each of a plurality of user equipment that are operating in the DRX state in the connected mode and that are associated with a given cell of said radio base station.

8. The radio base station of claim 7, wherein said idle mode corresponds to a Radio Resource Control (RRC) idle mode, and said connected mode corresponds to a RRC connected mode, and wherein said second distributer is configured to distribute paging messages according to said second paging schedule during at least part of a modification period prior to the change in system information.

9. The radio base station of claim 7, wherein said radio base station further comprises:
a paging scheduler configured to make said second paging schedule for user equipment operating in the DRX state in the connected mode independent of said first paging schedule for user equipment operating in the DRX state in the idle mode.

10. The radio base station of claim 7, wherein said second distributer is configured to distribute paging messages according to said second paging schedule that are common for connected user equipment associated with a given cell of said radio base station.

11. The radio base station of claim 7, wherein said second distributer is configured to distribute paging messages according to said second paging schedule that are dedicated for user equipment operating in the DRX state in the connected mode.

12. The radio base station of claim 7, wherein said second distributer is configured to distribute paging messages according to said second paging schedule that are dedicated for distributing system information change notifications.

13. The radio base station of claim 7, wherein said second distributer is configured to distribute paging messages according to said second paging schedule with a paging cycle based on the shortest configured On Duration period for DRX of said plurality of user equipment that are operating in the DRX state in the connected mode and that are associated with said given cell.

14. The radio base station of claim 7, wherein said second distributer is configured to distribute paging messages according to said second paging schedule based on transmission of a paging message at least every $n^{th}$ sub frame during a Broadcast Control Channel (BCCH) modification period prior to the change in system information, where n corresponds to the shortest configured On Duration period for the DRX state of the connected mode.

15. The radio base station of claim 7, wherein said second distributer is configured to distribute paging messages according to said second paging schedule based on transmission of a paging message in each of a number of sub frames during the longest DRX cycle period of said plurality of user equipment that are operating in the DRX state in the connected mode and that are associated with said given cell.

16. The radio base station of claim 7, wherein said second distributer is configured to distribute paging messages according to said second paging schedule based on transmission of a paging message in each of a number of sub frames during a Broadcast Control Channel (BCCH) modification period prior to the change in system information.

17. The radio base station of claim 7, wherein said radio base station comprises a controller configured to define said second paging schedule such that no paging messages are distributed according to said second paging schedule during a period when no system information needs to be updated.

18. The radio base station of claim 7, wherein said first distributer and said second distributer are implemented in the same circuitry as different functional units.

* * * * *